(12) United States Patent
Termonia

(10) Patent No.: US 7,622,404 B2
(45) Date of Patent: Nov. 24, 2009

(54) INCREASED BALLISTIC PERFORMANCE OF FABRICS COATED WITH POLYMER STRIPES

(75) Inventor: Yves Termonia, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 256 days.

(21) Appl. No.: 11/157,433

(22) Filed: Jun. 21, 2005

(65) Prior Publication Data

US 2006/0286880 A1 Dec. 21, 2006

(51) Int. Cl.
B32B 27/04 (2006.01)
(52) U.S. Cl. .......................................... 442/134; 2/2.5
(58) Field of Classification Search .................. 428/911; 442/134, 135, 149, 103, 188, 239; 2/2.5; 89/36.05
See application file for complete search history.

(56) References Cited

U.S. PATENT DOCUMENTS

| 4,678,702 A | 7/1987 | Lancaster et al. |
| 5,061,545 A | 10/1991 | Li et al. |
| 5,229,199 A | 7/1993 | Miner et al. |
| 5,554,816 A * | 9/1996 | Skaggs et al. ............... 89/36.17 |
| 5,668,344 A | 9/1997 | Bornstein |
| 5,776,839 A | 7/1998 | Dischler et al. |
| 6,846,548 B2 * | 1/2005 | Harpell et al. ............... 428/198 |
| 2002/0037391 A1 | 3/2002 | Harpell et al. |

FOREIGN PATENT DOCUMENTS

| WO | WO 90/06389 | 6/1990 |
| WO | WO 00/48821 | 8/2000 |

OTHER PUBLICATIONS

U.S. Appl. No. 11/158,762, filed Jun. 21, 2005, Sauer et al.
Y. Termonia. Impact Resistants of Woven Fabrics, Textile Research Journal, 74, 723-729 (2004).
Y. Termonia and P. Smith, Theoretical Study of the Ultimate Mechanical Properties of Poly(phenylene-terephthalamide) Fibers, Polymer, 27, 1845-1849 (1986).

* cited by examiner

*Primary Examiner*—Arti Singh-Pandey

(57) ABSTRACT

A fabric layer with a polymer disposed thereon in a series of curves, stripes, or combinations thereof and the polymer is substantially continuous within the series of curves, stripes, or combinations and covers no greater than 20% of the fabric layer and a process for making the layer.

10 Claims, 2 Drawing Sheets

INCREASED BALLISTIC PERFORMANCE OF FABRICS COATED WITH POLYMER STRIPES

BACKGROUND OF THE INVENTION

1. Field of the Invention

This invention is directed to coating fabrics with viscous polymer solutions for use in protective apparel.

2. Description of Related Art

Although many flexible body armor constructions adequately stop ballistic projectiles, blunt trauma can still cause substantial injury or death at a given basis weight of the fabric in an article, such as a protective vest. Conventionally, stiffer layers of fabric have been used near the body to reduce blunt trauma, but this is known to significantly compromise ballistic resistance to penetration. Further, because the fabrics are uniformly impregnated with the adhesive and in order to compensate for the associated increase in basis weight, the impregnated layers are typically placed near the body to reduce blunt trauma. This adds weight to the body armor that causes a reduction in comfort.

U.S. Pat. No. 5,776,839 discloses the application of dilatant dry powders, with a typical composition consisting of carbon black, fumed silica (nano-silica), and a small amount of adhesive "glue" to ballistic fibers and fabrics.

U.S. Pat. No. 5,229,199 considered rigid composites of woven aramid fabrics coated with an adhesion modifier and imbedded in a matrix resin. The reduced friction and weakened interfaces led to improved ballistic performance. If friction is too high in a fabric, or if the matrix is too stiff, ballistic resistance is severely compromised.

U.S. Pat. No. 5,061,545 relates to composite materials in which the resin acts as a binder for the fibers, which are mostly unidirectional. These fiber arrays are sandwiched between two continuous layers of resin.

US Publication 2002/0037391 A1 addresses resin application in patches for unidirectional structure for increased flexibility.

In order to significantly reduce basis weight, improvement in ballistic penetration resistance ($V_{50}$) and reduction in back face deformation (BFD) are needed. The present invention provides a means to solve this problem.

BRIEF SUMMARY OF THE INVENTION

This invention is directed to a fabric layer, comprising a coating of polymer, wherein the coating is disposed on the fabric layer in a series of curves, stripes, or combinations thereof and is substantially continuous within the series of curves, stripes, or combinations thereof and covers no greater than 20% of the fabric layer; and wherein the fabric has a pull out force of about 6.5 N/cm to 10 N/cm.

BRIEF DESCRIPTION OF THE DRAWING(S)

DETAILED DESCRIPTION OF THE INVENTION

The current invention allows for impregnation of appropriate fabrics with very strong resins, leading to unusually high fiber friction levels with no associated loss in $V_{50}$. Ballistic resistance of fiber fabrics is an extremely complex problem because of the interplay of a very large number of variables and the extremely short time (about 100 microseconds) of the event. Computer simulation has permitted insight and understanding into phenomena that were not previously understood, such as the role of fiber straining and inter-layer dynamics.

This is accomplished by the use of a broad range of liquid and solid polymer adhesives that are applied to the fabric in a series of relatively narrow stripes. The stripes can be in the form of straight lines, curves, or combinations thereof that are substantially continuous. The stripes should comprise no greater than about 20% of the fabric layer. The fabric suitably has a pull out force of about 6.5 N/cm to 10 N/cm, when formed from aramid fibers. Through computer studies, it has been determined that the poor ballistic resistance observed in some conventional fabrics used for protective apparel is due to (i) the low value of the yarn pull out force (ii) the generally uniform impregnation of strong adhesives in large amounts which leads to excessive bending stiffness and (iii) the use of hybrid systems in which very flexible fabrics layers are mixed with much stiffer impregnated fabric layers.

This has been addressed through application of the adhesive in narrow stripes and due to the reduced basis weight, the coated or impregnated fabrics can then be used throughout the multilayer system, thereby solving problem (iii) as noted above.

Figure 1:
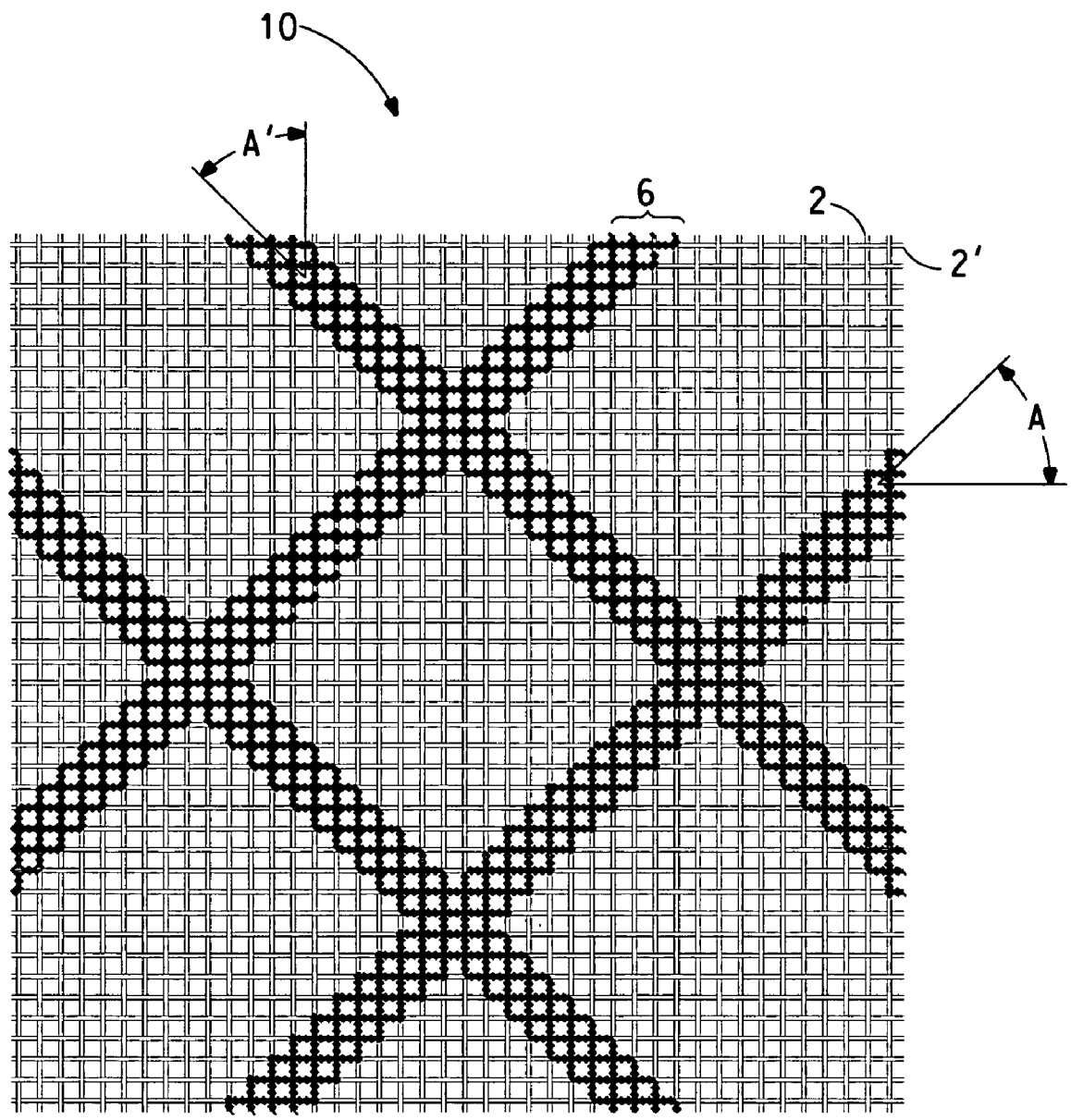
FIG. 1 is a schematic depiction of the arrangement of stripes of polymers.

In this computer model, the layers of fabric were analyzed as being coated with a strong adhesive placed along narrow stripes about 10 mm apart and extending along the diagonals, with respect to the pattern of the weave, corresponding to about an 18% coverage of the entire fabric area. A representative pattern of stripes is presented in FIG. 1. The stripes can have a width representing approximately two yarn crossovers as depicted in FIG. 1, wherein yarns 2 and 2' are substantially perpendicular as found in a warp/weft weave. As such, the width can vary depending on the tightness of the weave and the denier of the yarn making up the fabric. Preferably, the width of the stripes is about 2 mm. The stripes are arranged at angles A and A' that are complements (that is, their sum equals 90 degrees) with respect to either axis within the plane of the fabric weave as depicted in FIG. 1. As such, one or more stripes at angle A may be substantially parallel to each other and intersect at 90 degrees with one or more stripes at angle A' that are substantially parallel to each other. Angles A and A' are within the range from about 30 to 60 degrees. It is more preferable that A and A' are each about 45 degrees.

The role of the adhesive was assumed to increase (i) the yarn pullout force, $F_{pull}$ and (ii) the bending modulus by a value set at $E_{bend}=0.2.E_f.d^3/12$ (d=0.25 mm is the yarn diameter and $E_f=140$ Gpa is the tensile modulus, for aramid yarn). The pattern of stripes is shifted randomly from one layer to the next through the thickness of the pack. For testing, the packs are assumed as placed against a background having the elastic properties of clay (compressive modulus $E_c=3$ MPa) and tested against a spherical and non-deformable projectile having a mass of 10.2 g and a radius of 3.7 mm.

Ballistic penetration resistance was measured by solving strain wave equations across each layer as provided by Y. Termonia, Impact Resistance of Woven Fabrics. *Textile Research Journal*, 74, 723-729 (2004)] and breaking the yarns according to a kinetic fracture model based on Eyring's activation rate theory and Y. Termonia and P. Smith. Theoretical Study of the Ultimate Mechanical Properties of Poly (phenylene-terephthalamide) Fibers. *Polymer*, 27, 1845-1849 (1986)]. Actual Instron fiber pull-out tests have revealed that the high $F_{pull}=10$ N/cm value can be achieved by using an Hysol Epoxi 0151 resin with high toughness, such as EA 9313 (an aromatic amine epoxy, available from Loctite, Bay Point, Calif.) applied according to the teachings of the present invention. Other polymers suitable for coating the fabric include cyanoacrylate adhesives, urethane adhesives and aliphatic amine epoxy resins. The polymers can be homopolymers, copolymers, blends, or mixtures thereof.

Note finally that $F_{pull}$=10 N/cm corresponds, for impact at the center of a (40 cm×40 cm) layer, to a value close to the breaking strength of aramid yarn. These high values can only be achieved with very strong and stiff resins, which, in order to avoid punch-through, must be applied locally according to the teachings of the present invention.

Suitable materials for making the fabric layers include polyamide, aromatic polyamide, polyolefin, polybenzoxazole, polybenzothiazole, poly{2,6-diimidazo[4,5-b4',5'-e] pyridinylene-1,4(2,5-dihydroxy)phenylene}, polyareneazole, polypyridazole, polypyridobisimidazole, and mixtures thereof.

The invention provides for the fabrication of ballistic garments at substantially lower basis weights with a good balance of back face deformation and $V_{50}$. They also have the additional advantages of excellent drape properties, which increases the comfort.

EXAMPLES

Example 1

Packs of polyaramid fabric layers having a plain weave construction of 840 denier yarn (tensile modulus $E_f$=140 Gpa) and having a nominal face weight of 166 g/m² (4.9 oz/sqy) were simulated using a computer. Table 1 shows the calculated dependence of critical perforation velocity $V_{50}$ and back face deformation value BFD (measured at the corresponding $V_{50}$) on the total number of layers and the fiber pull-out force ($F_{pull}$) within the range 6-10 N/cm. The model predictions are for $V_{50}$ and BFD for layers treated with thin strips of a strong resin running along the diagonals.

TABLE 1

| Number of Layers | $F_{pull}$, N/cm | $V_{50}$, m/sec (ft/sec) | BFD, mm |
|---|---|---|---|
| 21 | 6 | 517 (1696) | 23 |
| 20 | 6 | 494 (1620) | 23 |
| 19 | 6 | 475 (1558) | 23 |
| 21 | 8 | 605 (1984) | 24 |
| 20 | 8 | 570 (1870) | 24 |
| 19 | 8 | 555 (1820) | 24 |
| 21 | 10 | 666 (2185) | 24 |
| 20 | 10 | 641 (2103) | 25 |
| 19 | 10 | 624 (2047) | 25 |

The results presented in Table 1 reveals a dramatic increase in $V_{50}$ at high $F_{pull}$ of about 8-10 N/cm.

Example 2

The modeling of the fabrics was the same as for Example 1, except for wider diagonal strips (about 4 mm), which are also placed farther apart (distance about 20 mm) in order to ensure substantially the same 18% coverage of the entire fabric area.

TABLE 2

| Number of Layers | $F_{pull}$, N/cm | $V_{50}$, m/sec (ft/sec) | BFD, mm |
|---|---|---|---|
| 21 | 6 | 488 (1601) | 22 |
| 20 | 6 | 484 (1588) | 23 |
| 19 | 6 | 460 (1509) | 24 |
| 21 | 8 | 594 (1949) | 24 |
| 20 | 8 | 560 (1837) | 24 |
| 19 | 8 | 524 (1719) | 23 |
| 21 | 10 | 645 (2116) | 22 |
| 20 | 10 | 620 (2034) | 24 |
| 19 | 10 | 587 (1925) | 24 |

The ballistic performance is about 15-20 m/sec lower than for the thinner strips in Table 1, which is still an acceptable result.

Comparative Example A

The following example illustrates the ballistic performance predicted by the computer model for a pack of 22 layers of fabric as described in Example 1, but with no resin. The value of $F_{pull}$ is typical of that measured experimentally for untreated 840 denier plain-woven aramid fabrics. As in Example 1, the BFD value has been measured at the corresponding $V_{50}$.

TABLE 3

| Number of Layers | $F_{pull}$, N/cm | $V_{50}$, m/sec (ft/sec) | BFD, mm |
|---|---|---|---|
| 22 | 0.4 | 452 (1482) | 37 |

The ballistic performance is substantially lower than that obtained in Examples 1 and 2

Comparative Example B

This case is similar to Example 1 except that the stripes are running along the yarn directions, that is, the stripes are mutually perpendicular to each other as warp and weft yarns are.

TABLE 4

| Number of Layers | $F_{pull}$, N/cm | $V_{50}$, m/sec (ft/sec) | BFD, mm |
|---|---|---|---|
| 21 | 6 | 465 (1525) | 20 |
| 20 | 6 | 452 (1482) | 20 |
| 19 | 6 | 416 (1365) | 20 |
| 21 | 8 | 537 (1761) | 21 |
| 20 | 8 | 516 (1692) | 21 |
| 19 | 8 | 486 (1594) | 21 |
| 21 | 10 | 609 (1998) | 22 |
| 20 | 10 | 602 (1975) | 23 |
| 19 | 10 | 544 (1784) | 22 |

The ballistic performance is substantially lower than in Example 1 by as much as 60 m/sec.

Comparative Example C

Figure 2:
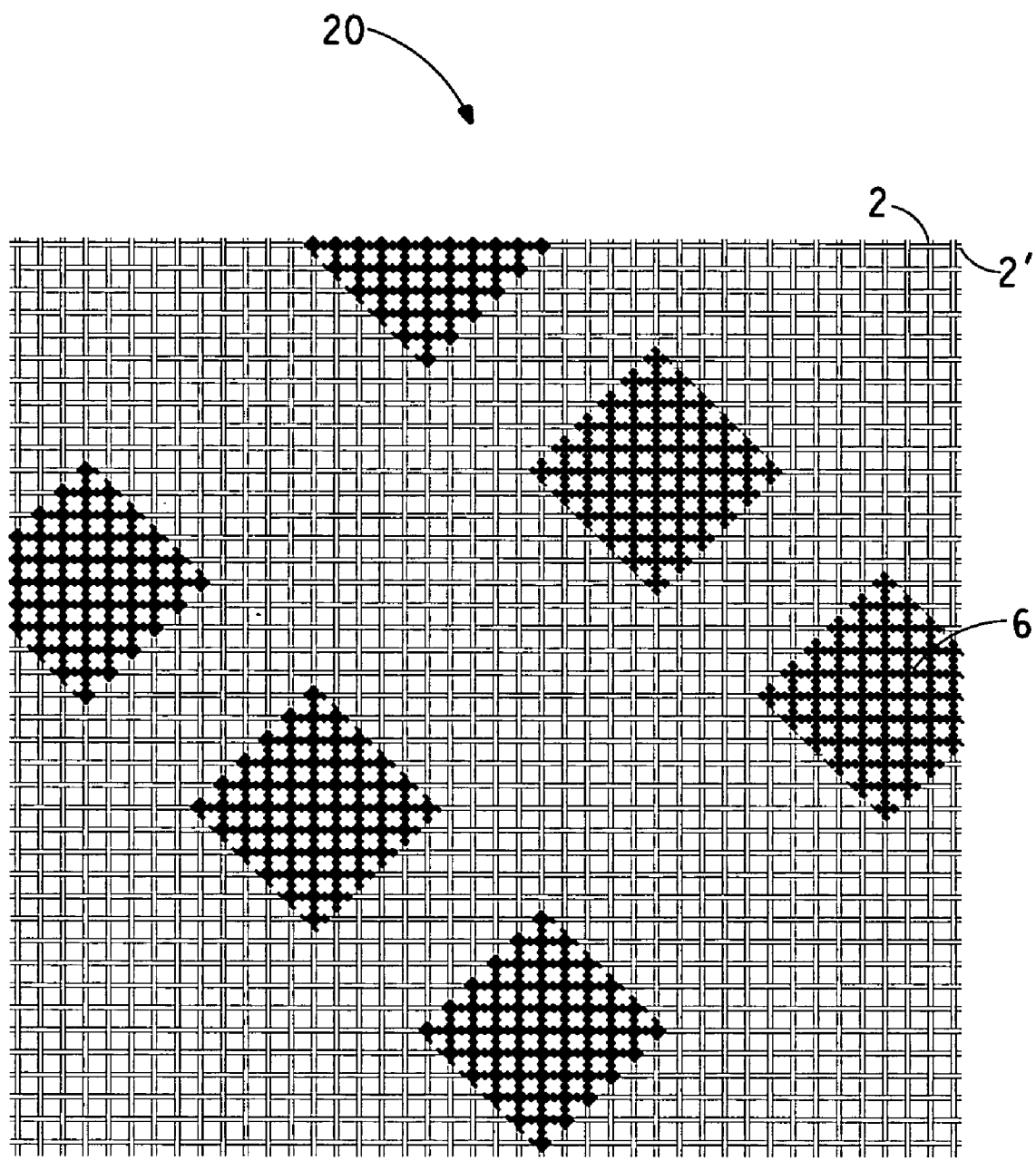
FIG. 2 is a schematic depiction of a conventional arrangement of polymers.

This example is for the case of resin applied into diamond shape patches with same 18% coverage of the fabric area. The diamonds are about 12 mm wide and they are placed 33 mm apart (center to center) in a satin design as depicted in FIG. 2. The diamond-shaped patches are in a satin pattern and have a diagonal width equal to about 11 crossovers.

TABLE 5

| Number of Layers | $F_{pull}$, N/cm | $V_{50}$, m/sec (ft/sec) | BFD, mm |
|---|---|---|---|
| 21 | 6 | 479 (1571) | 21 |
| 20 | 6 | 449 (1473) | 21 |
| 19 | 6 | 436 (1430) | 21 |
| 21 | 8 | 560 (1837) | 22 |
| 20 | 8 | 535 (1755) | 22 |
| 19 | 8 | 517 (1696) | 22 |
| 21 | 10 | 618 (2027) | 23 |
| 20 | 10 | 608 (1994) | 24 |
| 19 | 10 | 585 (1922) | 23 |

The ballistic performance for $V_{50}$ is lower than in Example 1 by as much as 45 m/sec.

What is claimed is:

1. A ballistic resistant fabric comprising a woven fabric layer, wherein a polymer is disposed on the fabric layer in a series of substantially parallel curves, stripes, or combinations thereof and is substantially continuous within the series of curves, stripes, or combinations thereof, and covers no greater than 20% of the fabric layer; the series of curves, stripes, or combinations, thereof arranged at complementary angles in a range of 30 to 60 degrees with respect to either axis within the plane and along the directions of the fabric weave, and wherein the fabric has a pull out force of about 6.5 N/cm to 10 N/cm.

2. The fabric layer of claim 1, comprising material selected from the group consisting of polyamide, aromatic polyamide, polyolefin, polybenzoxazole, polybenzothiazole, poly{2,6-diimidazo[4,5-b4', 5'-e]pyridinylene-1,4(2,5-dihydroxy) phenylene}, polyareneazole, polypyridazole, polypyridobisimidazole, and mixtures thereof.

3. The fabric of claim 1, wherein the polymer is selected from the group consisting of cyanoacrylate adhesives, urethane adhesives, aliphatic amine epoxy resins, and aromatic amine epoxy resins.

4. The fabric of claim 3, wherein the polymer is a cyanoacrylate adhesive.

5. The fabric of claim 1, wherein the polymer is a urethane adhesive.

6. The fabric of claim 1, wherein the polymer is an aliphatic amine epoxy resin.

7. The fabric of claim 1, wherein the polymer is an aromatic amine epoxy resin.

8. The fabric of claim 1, wherein the polymer is of a width sufficient to substantially cover the longest diagonal cross section of a single weave crossover.

9. The fabric of claim 1, wherein the complementary angles are each 45 degrees.

10. An article, comprising about 10 to 60 layers of the fabric of claim 1.

* * * * *